United States Patent [19]

Isono

[11] Patent Number: 4,891,953
[45] Date of Patent: Jan. 9, 1990

[54] CONTROL DEVICE FOR AN AIR CONDITIONER WITH FLOOR TEMPERATURE SENSOR

[75] Inventor: Kazuaki Isono, Shizuoka, Japan

[73] Assignee: Mitsubishi Denki Kabushiki Kaisha, Tokyo, Japan

[21] Appl. No.: 304,560

[22] Filed: Feb. 1, 1989

[30] Foreign Application Priority Data

Feb. 1, 1988 [JP] Japan .................................. 63-21515

[51] Int. Cl.$^4$ .............................................. F25B 41/00
[52] U.S. Cl. ........................................ 62/209; 62/229; 236/78 B
[58] Field of Search ................ 236/78 B; 62/209, 229, 62/228.4

[56] References Cited

U.S. PATENT DOCUMENTS 4,364,237 12/1982 Cooper et al. ................. 62/228.4 X
4,407,139 10/1983 Ide et al. ......................... 62/228.4 X
4,658,888 4/1987 Sakurai et al. ..................... 236/78 B
4,697,430 10/1987 Toyoda et al. ......................... 62/209

FOREIGN PATENT DOCUMENTS 0003711 8/1979 European Pat. Off. .
58102046 6/1983 Japan .
0201119 11/1984 Japan .................................. 236/78 B
61-250424 11/1986 Japan .
62-56716 3/1987 Japan .
2091453 11/1981 United Kingdom .

Primary Examiner—William E. Wayner
Attorney, Agent, or Firm—Oblon, Spivak, McClelland, Maier & Neustadt

[57] ABSTRACT

A control device for an air conditioner including a compressor driven by an inverter is disclosed. The control device comprises a floor temperature sensor as well as a room temperature sensor for detecting representative room temperature. A standard operation frequency of the compressor is determined on the basis of the difference between the target temperature and the representative room temperature detected by the room temperature sensor. Adjustment is made to the standard operation frequency according to the difference between the temperatures detected by the two temperature sensors, thereby obtaining an operation frequency of the compressor.

9 Claims, 5 Drawing Sheets

CONTROL DEVICE FOR AN AIR CONDITIONER WITH FLOOR TEMPERATURE SENSOR

BACKGROUND OF THE INVENTION

1. Field of the Invention

This invention relates to control devices for air conditioners, and more particularly to control devices for air conditioners which are capable of creating an optimum temperature environment under various conditions.

2. Description of the Prior Art

There are a variety of air conditioning systems; most widely used among them are self-contained small units which are utilized for conditioning a single room, etc. These small self-contained air conditioners usually comprise a compressor for circulating a refrigerant gas in a heat pump system, and are installed in a room to deliver warmed or cooled air thereto. Since the warmed or cooled air is sent out from an indoor unit of a small dimension in the case of such air conditioners, there tends to develop an unevenness in the distribution of temperature in the room. Thus, although these air conditioners comprise a room temperature sensor and the operation of the compressor is controlled in such a way that the detected room temperature may approach a target temperature, it often happens that the temperature environment in the room is deviated from the optimum condition.

FIGS. 1 and 2 show a conventional air conditioner disclosed, for example, in the Japanese patent publication No. 60-1253. An alternating current power supplied from the power source 1 is rectified by a rectifier circuit 2, and the direct current power outputted from the rectifier circuit 2 is supplied to an inverter 3, which outputs an alternating current power of variable frequency. The inverter 3 is capable of varying the output frequency continuously in the range of about from 25 to 80 Hz., thereby changing the rotational speed of the compressor 4 of the air conditioner in the range of from 1400 to 4500 rpm. The output frequency of the inverter 3 is controlled by a digital control signal outputted from the control device 5 which comprises a microcomputer. Into this microcomputer is inputted the following signals: the operation signals outputted from the display and operation portion 6, the room temperature detected by a temperature sensor 8, and the refrigerant condensation temperature detected by another temperature sensor 9. On the basis of these signals, the microcomputer of the control device 5 controls the operations of the loads 7, including the four-way valve for changing over the direction of the refrigerant in the heat pump system and the motor for the fan for delivering warmed or cooled air to the conditioned room, according to a predetermined program; at the same time, it outputs a frequency setting signal to the inverter 3 and lets the display device (consisting of light-emitting diodes) of the display and operation portion 6 display the state of operation of the compressor 4.

The display and operation portion 6 comprises, as shown in FIG. 2, a bar display 11 which displays the rotational speed or rpm of the compressor 4 as the performance level, a temperature setting device 12 which sets a target room temperature, a switch 13 for changing over the power of the indoor fan (not shown), an operation stop switch 14 for stopping the operation of the air conditioner, mode selecting switches 15 and 16 for selecting the cooling or the heating operation mode of the air conditioner, and a display device consisting of light-emitting diodes 17 and 18 which displays the operation mode, i.e., the cooling or the heating operation mode, of the air conditioner.

As mentioned above, the control device 5 consists mainly of a microcomputer, which controls the output frequency of the inverter 3 on the basis of the difference between the target temperature set by the temperature setting device 12 and the room temperature detected by the temperature sensor 8. This control of the output frequency of the inverter 3 by the microcomputer of the control device 5 is effected as follows:

The possible variation range of the temperature difference: $Ta - T_1$ between the room temperature Ta and the target temperature $T_1$ is divided into six zones A through F (as described hereinafter), and the output frequency of the inverter 3 is set at the levels indicated at the right-hand column of the following table at the line corresponding to zones A through F in the right hand column:

| $Ta - T_1$ | output frequency (Hz.) |
|---|---|
| zone A | 75 |
| zone B | 65 |
| zone C | 55 |
| zone D | 45 |
| zone E | 35 |
| zone F | stopped |

Namely, when the temperature difference is in zone A, the inverter 3 is set at the output frequency of 75 Hz.; when in zone B, at 65 Hz., and so on; when the temperature difference is in zone F, the output of the inverter 3 is reduced to zero so that the compressor 4 is stopped.

The standard of division into these zones A through F of the temperature difference: $Ta - T_1$ varies according as the room temperature is rising or falling. The division into zones A through F of the temperature difference: $Ta - T_1$ in the cases of rising and falling room temperature in the cooling operation of the air conditioner is made as follows:

When the room temperature is falling, as in region X of the temperature variation curve: $Ta - T_1$ in FIG. 3, the possible variation range of the temperature difference: $Ta - T_1$ is divided into six zones A through F as shown at the left in FIG. 3: the temperature difference: $Ta - T_1$ lies in zone A when it is equal to or greater than one degree centigrade; in zone B, when it is from 0.5 to one degree; in zone C when it is from 0 to 0.5 degrees; in zone D when the room temperature Ta is lower than the target temperature $T_1$ by 0 to 0.5 degrees; in zone E when the room temperature is lower than the target temperature by 0.5 to one degree; and in zone F when the room temperature is lower than the target temperature by one degree or more.

On the other hand, when the room temperature is on the rise, as in region Y of the temperature variation curve: $Ta - T_1$ shown in FIG. 3, the possible variation range of the temperature difference: $Ta - T_1$ is devided into six zones A through F as shown at the right in FIG. 3: the temperature difference lies in zone A when it is equal to or greater than 1.5 degrees centigrade; in zone B, when it is from one to 1.5 degrees; in zone C when it is from 0.5 to one degree; in zone D when it is from 0 to 0.5 degrees; in zone E when the room temperature Ta is lower than the target temperature $T_1$ by 0 to 0.5 degrees; and in zone F when the room temperature is lower than the target temperature by 0.5 degrees or more. By the way, zone D is the target zone to which the temperature difference: $T_a-T_1$ is controlled.

FIG. 4 shows a typical variation curve (a) of the room $T_a-T_1$ is controlled.

FIG. 4 shows a typical variation curve (a) of the room temperature (or more precisely, the temperature difference: $T_a-T_1$) and a curve (b) of the output frequency of the inverter 3 corresponding thereto, which are obtained when the air conditioner is controlled according to the above described method in the cooling operation mode. As shown in the figure, before the time point $t_1$, the falling room temperature $T_a$ is more than one degree higher than the target temperature $T_1$, and thus the temperature difference, $T_a-T_1$, lies in zone A, and the output frequency of inverter 3 is 75 Hz.; the room temperature therefore falls rapidly. Between time points $t_1$ and $t_2$, the temperature difference: $T_a-T_1$ lies in zone B, and hence the output frequency of inverter 3 is 65 Hz., while between time points $t_2$ and $t_3$, the temperature difference lies in zone C, and hence the output frequency of inverter 3 is 55 Hz.; thus, the room temperature continues to fall. After the time point $t_3$, the temperature difference, $T_a-T_1$, comes into zone D, and the output frequency of inverter 3 is 45 Hz. Even when, thereafter, the room temperature $T_a$ rises above the target temperature $T_1$, the temperature difference, $T_a-T_1$, remains in zone D, since the temperature difference is in the range of from 0 to one degree; thus, the output frequency of inverter 3 is kept at 45 Hz. This stability of the output frequency of the inverter 3 is due to the fact that the zones A through F of the temperature difference, $T_a-T_1$, are set 0.5 degrees higher in the region where the room temperature is rising than in the region where it is falling, as described above. This gap of 0.5 degrees in the zone settings between the cases of rising and falling room temperature functions as a kind of hysteresis in the control of the room temperature. Thus, after the room temperature reaches the target level, the output frequency of the inverter 3 ceases to vary frequently, and a stable control operation is effected.

The conventional air conditioner as described above has the following disadvantage. Namely, the temperature distribution in the air-conditioned room can not be detected accurately by a single temperature sensor; as a result, even if the room temperature detected by the sensor is controlled to the target temperature, the temperature environment in the room may be deviated from the optimum condition. Since the air warmed or cooled by the air conditioner is sent out from an indoor unit of a small dimension in the case of such air conditioners, there tends to develop an unevenness in the distribution of temperature in the room. Further, the temperature distribution in the room depends on the gap between the indoor and outdoor temperatures and the heat insulating property of the room, which makes it more difficult to grasp the temperature distribution by a single sensor.

SUMMARY OF THE INVENTION

It is the primary object of this invention therefore to provide a control device for an air conditioner which is capable of creating an optimum temperature environment under various conditions.

It is an additional object of this invention to provide such a control device for an air conditioner which is simple in organization and reliable in operation.

The above objects are accomplished in accordance with the principles of this invention in a control device for an air conditioner which comprises a floor temperature sensor as well as a temperature sensor for detecting a room temperature substantially above the floor level. The output power level of the air conditioner is determined on the basis of the temperatures detected by these two temperature sensors and the target temperature set by a temperature setting means in two steps: first, a standard output power level is determined by standard output power determining means on the basis of the difference, computed by the first comparator, between the target temperature and the room temperature detected by the sensor substantially above the floor; next, this standard output power level is modified by an adjustment means to obtain the output power level to which the air conditioner is controlled. This modification by the adjustment means is effected on the basis of the difference, computed by a second comparator, between the temperatures detected by the two sensors: one at a level substantially higher than the floor level and the other substantially at the floor level of the room. In a preferred embodiment, the standard output power determining means determines the standard output power level at an increasingly higher level as the difference between the target temperature and the temperature detected by the temperature sensor substantially above the floor level increases. Further, it is preferred that, in the heating operation of the air conditioner, the output power level of the air conditioner is determined by the adjustment means at an increasingly higher level as the difference, computed by the second comparator, between the temperatures detected by the two temperatures sensors increases.

BRIEF DESCRIPTION OF THE DRAWINGS

The novel features which are believed to be characteristic of this invention is set forth with particularity in the appended claims; this invention itself, however, both as to its organization and method of operation, may be best understood from the following detailed description of the preferred embodiments, taken in conjunction with the accompanying drawings, in which:

In the drawings, like reference numerals represent like or corresponding parts or portions.

DETAILED DESCRIPTION OF THE PREFERRED EMBODIMENTS

Figure 1:
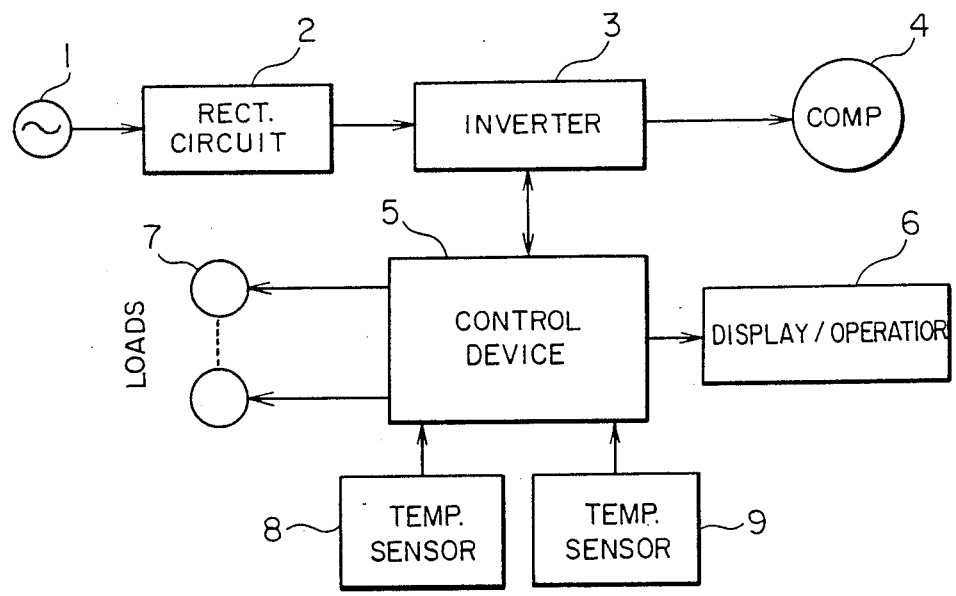
FIG. 1 is a block diagram showing an organization of a conventional control device for an air conditioner including a compressor driven by an inverter.
Figure 2:
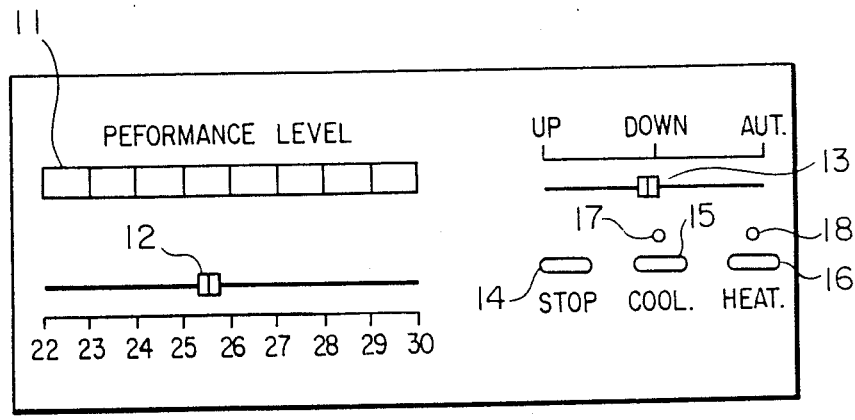
FIG. 2 is a front view of the display and operation panel of the air conditioner of FIG. 1.
Figure 3:
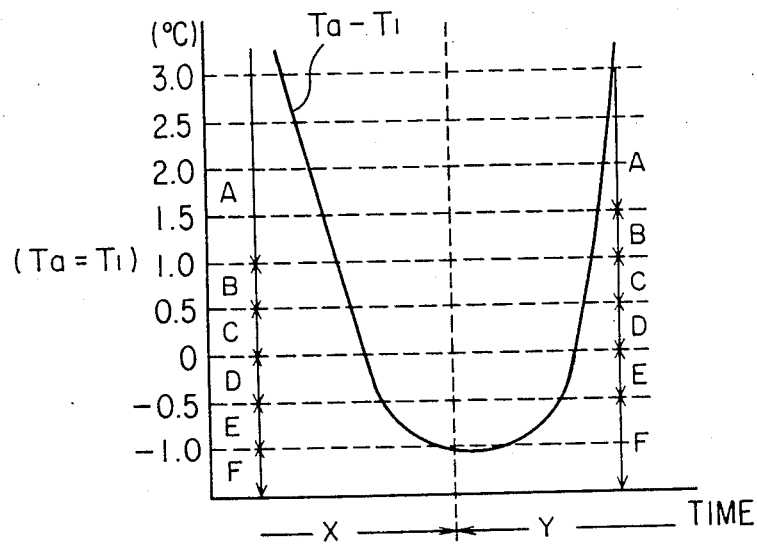
FIG. 3 is a diagram showing the zones into which the possible variation range of the difference between the target and the room temperature is divided in the case of the conventional control device of FIG. 1.
Figure 4:
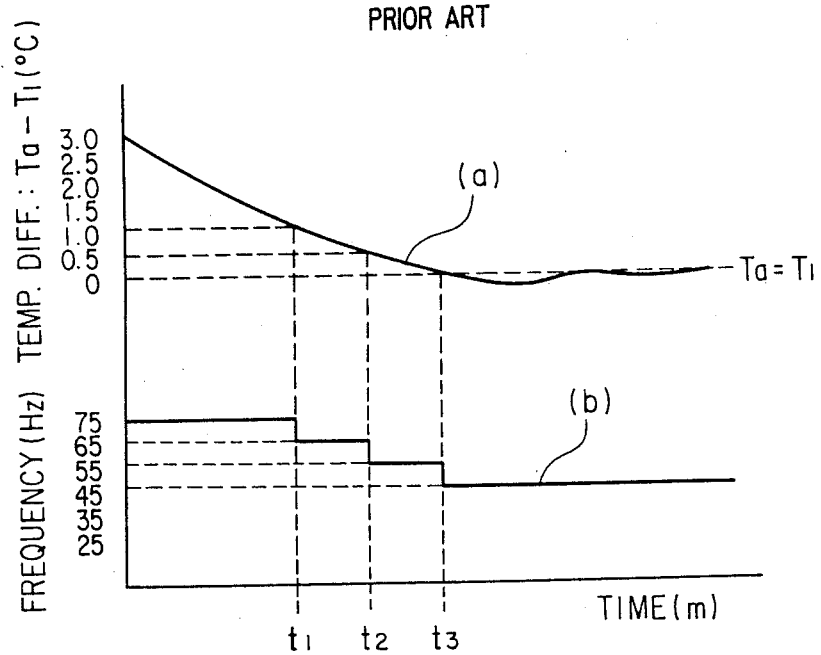
FIG. 4 shows variation curves of the room temperature (or the difference between the room and target temperatures) and the operation frequency of the compressor of the air conditioner of FIG. 1.
Figure 5:
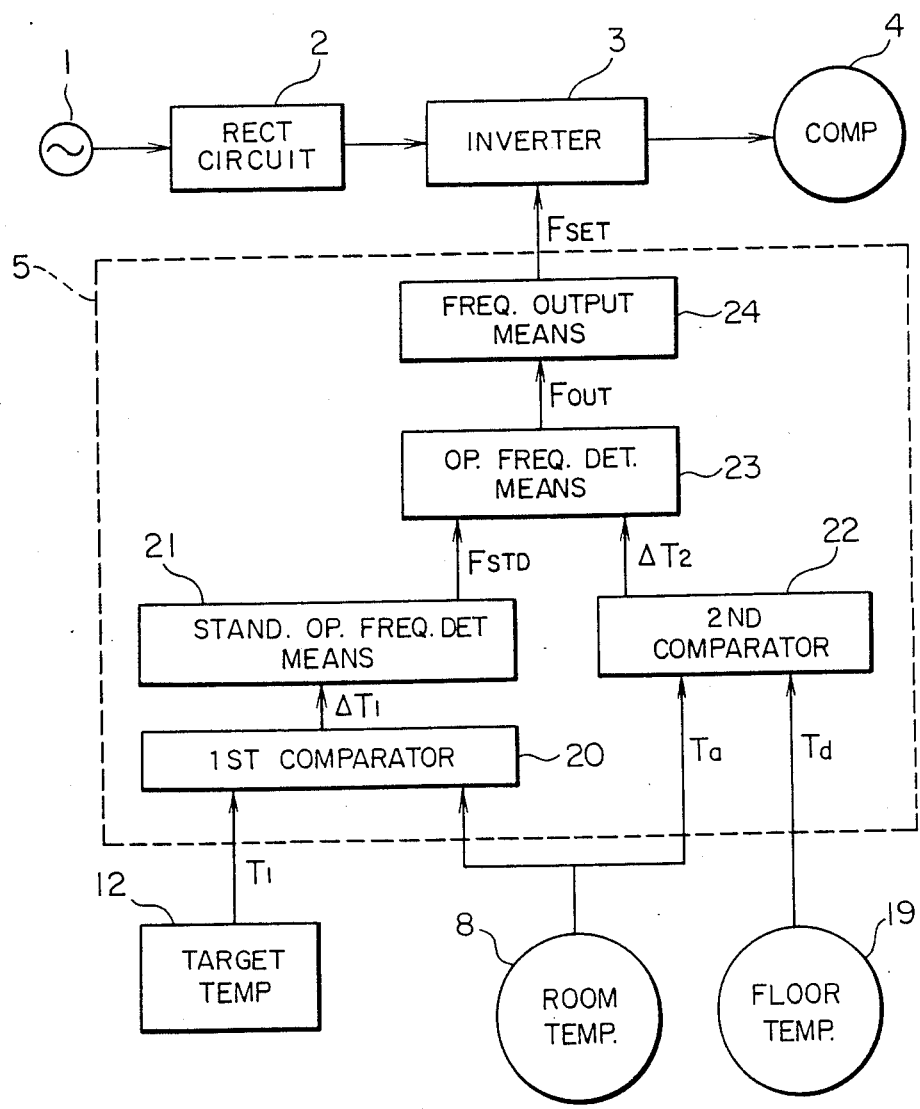
FIG. 5 is a block diagram showing an organization of a control device for an air conditioner according to this invention.
Figure 6:
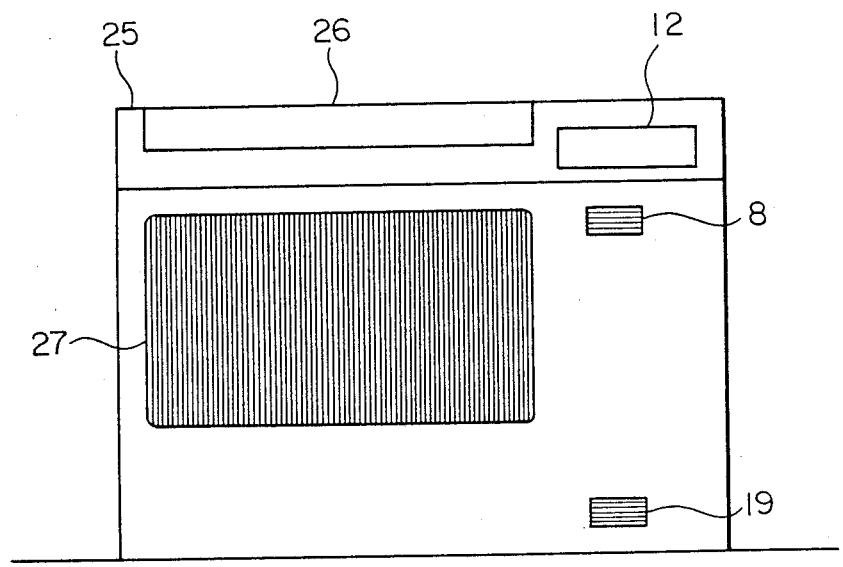
FIG. 6 is a front view of the indoor unit of the air conditioner of FIG. 5.
Figure 7:
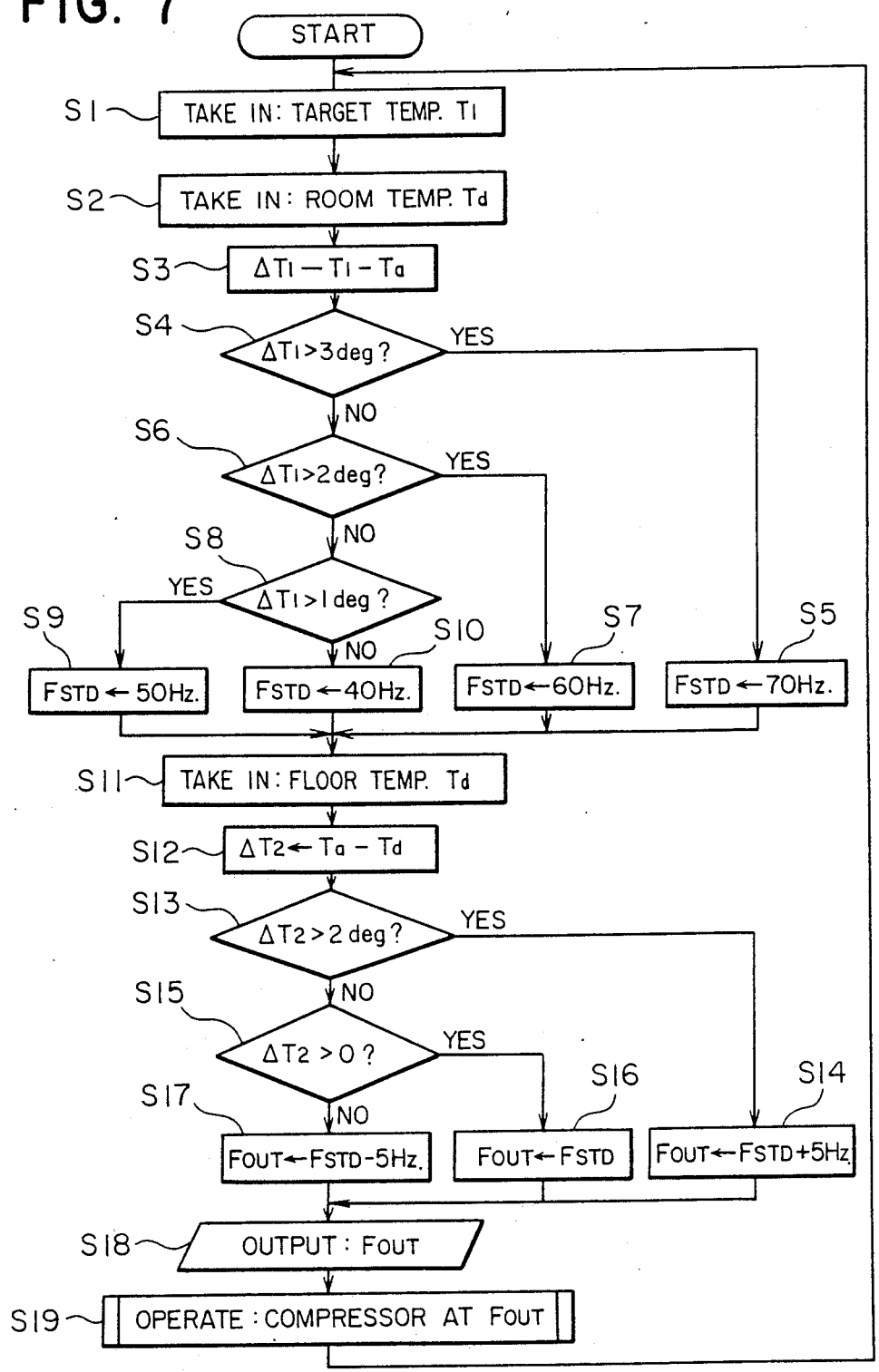
FIG. 7 is a flowchart showing the steps followed by the control device of FIG. 5 in controlling the air conditioner in the heating operation mode.

Referring now to FIGS. 5 through 7 of the drawings, an embodiment of this invention is decribed.

As shown in FIG. 5, the air conditioner controlled by the control device 5 according to this invention comprises a compressor 4 for circulating a refrigerant in a heat pump system. The alternating current supplied from the power source 1 is rectified by a rectifier circuit 2, and the direct current power outputted from the rectifier circuit 2 is supplied to an inverter (dc-to-ac converter) 3, which outputs an alternating current power of variable frequency. The inverter 3 is capable of varying the output frequency continuously in the range of about from 25 to 80 Hz., thereby changing the rotational speed of the compressor 4 of the air conditioner in the range of from 1400 to 4500 rpm. The output frequency of the inverter 3 is controlled by a digital control signal outputted from the control device 5, as described in detail below.

The inputs to the control device 5 include the signals outputted from the following elements: temperature setting device 12 through which the user of the air conditioner sets a target room temperature; a room temperature sensor 8 for detecting the temperature of the room conditioned by the air conditioner at a level substantially higher than the floor level, wherein the room temperature detected by the sensor 8 is a representative room temperature corresponding to the average room temperature; and a floor temperature sensor 19 for detecting the temperature of the room substantially at the floor level. As shown in FIG. 6, the floor temperature sensor 19 is disposed on the front face of the indoor unit 25 of the air conditioner at the right bottom corner thereof; the room temperature sensor 8 is disposed near the top corner above the floor temperature sensor 19; the target temperature setting device 12, on the other hand, is disposed above the room temperature sensor 8. Further, the indoor unit 25 has an air outlet and inlet openings 26 and 27 formed on the front face thereof, the air outlet opening 26 being situated above the inlet opening 27.

The control device 5 consists mainly of a microcomputer which computes, following a predetermined program stored therein, the output frequency of the inverter 3 on the basis of the information inputted from the sensors 8 and 19 and the device 12; the computation is effected by the means 20 through 24 comprised in the control device 5 as follows:

First, a standard operation frequency $F_{STD}$ of the compressor (which corresponds to the standard output power level of the air conditioner) is determined: A first comparator 20, coupled to the outputs of the target temperature setting device 12 and the room temperature sensor 8, computes the difference: $\Delta T_1 = T_1 - Ta$ between the target temperature $T_1$ set by the user through the device 12 and the representative room temperature Ta detected by the sensor 8. A standard operation frequency determining means 21, coupled to the output of the first comparator 20, determines the standard operation frequency $F_{STD}$ of the compressor on the basis of the above difference $\Delta T_1$ computed by the first comparator 20. In the heating operation, means 21 determines the standard frequency $F_{STD}$ at an increasing higher level as the difference $\Delta T_1$ becomes greater. The same is true in the cooling operation, if the sign of the difference $\Delta T_1$ is inverted. Namely, if $\Delta T_1$ is defined by the equation: $\Delta T_1 = Ta - T_1$ in the cooling operation, the standard frequency $F_{STD}$ is determined also at a increasingly higher level by the standard frequency determining means 21 as the difference $\Delta T_1$ increases. Thus, both in the heating and cooling operation mode, the standard frequency $F_{STD}$ may be determined according to the following equation:

$$F_{STD} = k_1 \cdot \Delta T_1 + c_1, \quad (1)$$

wherein $k_1$ and $c_1$ are positive constants and $\Delta T_1$ is the above defined temperature difference. However, in the preferred embodiment in which the standard frequency $F_{STD}$ is determined by a microcomputer according to a program, the values of $F_{STD}$ are preferred to be quantized, as described below in reference to FIG. 7, in which case standard frequency $F_{STD}$ takes only discrete values which are separated from each other by, for example, 10 Hz.

Next, the operation frequency of the compressor $F_{OUT}$ (i.e., the output frequency of the inverter 3; the operation frequency $F_{OUT}$ of the compressor corresonds to the output power of the air conditioner) is determined by making an adjustment to the standard frequency $F_{STD}$ as follows: First, a second comparator 22, coupled to the outputs of the room and the floor temperature sensor 8 and 19, computes the difference $\Delta T_2 = Ta - Td$ between the temperatures Ta and Td detected by the room and the floor temperature sensor 8 and 19, respectively. Then, the operation frequency determining means 23, coupled to the outputs of the standard frequency determining means 21 and the second comparator 22, determines the operation frequency of the compressor $F_{OUT}$ by making an adjustment to the standard frequency $F_{STD}$ according to the magnitude of the above temperature difference $\Delta T_2$ computed by the second comparator 22. In the heating operation of the air conditioner, if the standard frequency $F_{STD}$ remains at the same level, the operation frequency of the compressor $F_{OUT}$ is determined at an increasing higher level as the temperature difference $\Delta T_2$ increases. More precisely, the operation frequency $F_{OUT}$ may be determined according to the following equation:

$$F_{OUT} = F_{STD} + k_2 \cdot \Delta T_2 + c_2, \quad (2)$$

wherein $k_2$ is a positive constant and $c_2$ is a preferably negative constant. However, since the determination of the operation frequency $F_{OUT}$ is effected by a microcomputer according to a program in this embodiment, the values of the operation frequency $F_{OUT}$ is preferred to be quantized as described in detail in reference to FIG. 7. In such case, the operation frequency $F_{OUT}$ takes discrete values separated from each other by, for example, 5 Hz. In the cooling operation, on the other hand, the operation frequency of the compressor $F_{OUT}$ is decreased as the temperature difference $\Delta T_2$ as defined above increases. Namely, the constant $k_2$ in equation (2) takes a negative value in the cooling operation mode.

A frequency output means 24, coupled to the output of the the operation frequency determining means 23, outputs a frequency setting signal $F_{SET}$, corresponding to the operation frequency of the compressor $F_{OUT}$, to the inverter 3. In response thereto, the inverter 3 supplies an alternating current of the frequency $F_{OUT}$ to the compressor 4, so that the compressor 4 is operated at the operation frequency $F_{OUT}$. As a result, the output power of the air conditioner is controlled to a level corresonding to the operation frequency $F_{OUT}$ of the compressor 4.

Referring now to FIG. 7, the steps followed by the microcomputer of the control device 5 in determining the operation frequency $F_{OUT}$ of the compressor 4 in the heating operation mode of the air conditioner is described.

First, at step S1, the target temperature $T_1$ set previously by the user of the air conditioner through the target temperature setting device 12 is taken in and registered; at step S2, the representative room temperature Ta in the room, detected by the temperature sensor 8, is taken in and registred. Further, at step S3, the difference: $\Delta T_1 = T_1 - Ta$ between the target temperature $T_1$ and room temperature Ta is computed by the first comparator 20.

Next, at steps S4 through S10, the standard operation frequency determining means 21 determines the standard operation frequency $F_{STD}$ corresponding to the difference between the target temperature $T_1$ and the room temperature Ta, following the idea expressed in the above equation (1). Namely, judgement is made at step S4 whether $\Delta T_1$ is greater than 3 degrees centigrade or not, i.e., whether the inequality: $\Delta T_1 > 3°$ C. holds or not. If the judgement at step S4 is in the affirmative, the standard operation frequency $F_{STD}$ is set at 70 Hz at step S5. On the other hand, when the judgement is negative at step S4, further judgement is made at step S6 whether $\Delta T_1$ is greater than 2 degrees or not, i.e. whether it satisfies the relationship: $3°$ C.$\geq \Delta T_1 > 2°$ C. If the judgement at step S6 is in the affirmative, the standard frequency $F_{STD}$ is set at 60 Hz. On the other hand, if the judgement at step S6 is in the negative, further judgement is made whether $\Delta T_1$ is greater than one degree or not at step S8, i.e. whether it satisfies the relationship: $2°$ C.$\geq \Delta T_1 > 1°$ C. or not. If the judgement at step S8 is in the affirmative, the standard frequency $F_{STD}$ is set to 50 Hz. at step S9; if in the negative, the frequency $F_{STD}$ is set at 40 Hz. at step S10.

Next, at step S11, the temperature Td near the floor in the room is taken in and registered. Then, at step S12, the difference: $\Delta T_2 = Ta - Td$ between the representative room temperature Ta and the floor temperature Td is computed by second comparator 22. Further, at steps S13 through S17, in accordance with the difference $\Delta T_2$ between the room temperature Ta and the floor temperature Td, adjustment is made by the operation frequency determining means 23 to the standard operation frequency $F_{STD}$ to determine the operation frequency $F_{OUT}$. Namely judgement is made at step S13 whether the difference $\Delta T_2$ is greater than 2 degrees or not, i.e., whether $\Delta T_2 > 2°$ C. holds or not. If the judgement at step S13 is in the affirmative, the operation frequency $F_{OUT}$ is set 5 hertzes higher than the standard frequency $F_{STD}$, i.e. it is set according to the equation: $F_{OUT} = F_{STD} + 5$ Hz., at step S14; if in the negative, further judgement is made at step S15 whether $\Delta T_2$ is greater than zero or not, i.e. whether or not it satisfies the relationship: $2°$ C.$\geq \Delta T_2 > 0°$ C. If the judgement at step S15 is in the affirmative, operation frequency $F_{OUT}$ is set at the standard frequency $F_{STD}$ at step S16; if in the negative, i.e. if $0 \geq \Delta T_2$, the operation frequency $F_{OUT}$ is set 5 hertzes lower than the standard operation frequency $F_{STD}$, i.e., it is set according to the equation: $F_{OUT} = F_{STD} - 5$ Hz., at step S17.

Further, at step 18, the operation frequency $F_{OUT}$ of the compressor 4 determined at one of the steps S14, S16, and S17 is converted into frequency setting signal $F_{SET}$ by the frequency output means 24, which is outputted therefrom to the inverter 3. Thus, at step S19, alternating current of the frequency $F_{OUT}$ is supplied from the inverter 3 to the compressor 4. As a result, the compressor 4 is rotated at a speed corresponding to the operation frequency $F_{OUT}$. Thereafter, the program returns to step S1, and steps S1 through S19 are repeated.

While description has been made of the particular embodiment of this invention, it will be understood that many modification may be made without departing from the spirit thereof. For example, although the air conditioner described above comprises a compressor the output power of which is controlled by the frequency of the alternating current supplied from an inverter, the principle of this invention is equally applicable to cases where the output power of the air conditioner is controlled by means other than the operation frequency of the compressor. The appended claims are contemplated to cover any such modifications as fall within the true spirit and scope of this invention.

What is claimed is:

1. A control device for an air conditioner, comprising:
   first temperature sensor means for detecting a temperature of a room conditioned by the air conditioner, at a level substantially higher than a floor level of the room;
   second temperature sensor means for detecting a temperature of the room conditioned by the air conditioner, substantially at the floor level of the room;
   target temperature setting means for setting a target temperature of the room conditioned by the air conditioner;
   first comparator means, coupled to outputs of said target temperature setting means and said first temperature sensor means, for computing a difference between said target temperature and the room temperature detected by said first temperature sensor means;
   second comparator means, coupled to outputs of said first and second temperature sensor means, for computing a difference between temperatures detected by said first and second temperature sensor means;
   standard output power determining means, coupled to an output of said first comparator means, for determining a standard output power level of the air conditioner in accordance with said difference between the target temperature and the temperature detected by the first temperature sensor means; and
   adjustment means, coupled to outputs of said standard output power determining means and said second comparator means, for determining an output power level to which the air conditioner is to be controlled, by making an adjustment to said standard output power level of the air conditioner, determined by said standard output power determining means, in accordance with said difference between temperatures detected by said first and second temperature sensor means.

2. A control device for an air conditioner as claimed in claim 1, wherein:
   said air conditioner includes a compressor supplied with an alternating current output of an inverter of a variable output frequency, and a rotational speed of said compressor is regulated by said variable frequency of the alternating current output of the inverter, the output power level of the air conditioner corresponding to the rotational speed of the compressor;

said standard output power determining means determines a standard frequency of the alternating current output from said inverter at which frequency the compressor is rotated at a speed corresponding to said standard output power level of the air conditioner; and said adjustment means determines a frequency of the alternating current supplied from the inverter to the compressor, by making an adjustment to said standard frequency of the alternating current outputted from the inverter, in accordance with said difference between temperatures detected by said first and second temperature sensor means.

3. A control device for an air conditioner as claimed in claim 1 or 2, wherein said first temperature sensor means detects a representative room temperature corresponding to an average temperature in the room.

4. A control device for an air conditioner as claimed in claim 1 or 2, wherein, said standard output power determining means determines the standard output power level at an increasingly higher level as said difference between said target temperature and the temperature detected by said first temperature sensor means becomes greater.

5. A control device for an air conditioner as claimed in claim 4, wherein said standard output power level is quantized and takes discrete values.

6. A control device for an air conditioner as claimed in claim 4, wherein, in the heating operation of the air conditioner, said output power level of the air conditioner is determined by said adjustment means at an increasingly higher level as said difference, computed by said second comparator, beween the temperatures detected by said first and second temperature sensors increases.

7. A control device for an air conditioner as claimed in claim 6, wherein said output power level is quantized and takes discrete values.

8. A control device for an air conditioner as claimed in claim 7, wherein, in a heating operation of the air conditioner, said adjustment means determines said output power level at a level higher than said standard output power level by a predetermined magnitude, when the temperature detected by first temperature sensor means is higher than the temperature detected by said second temperature sensor means by more than a predetermined number of degrees.

9. A control device for an air conditioner as claimed in claim 8, wherein, in a heating operation of the air conditioner, said adjustment means determines said output power level at a level lower than said standard output power level by a predetermined magnitude, when the temperature detected by first temperature sensor means is lower than the temperature detected by said second temperature sensor means.

* * * * *